No. 633,423. Patented Sept. 19, 1899.
J. A. BURNS.
EGG SEPARATOR.
(Application filed Nov. 18, 1898.)
(No Model.)
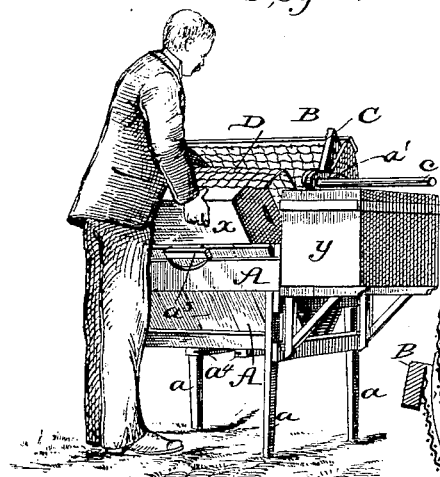
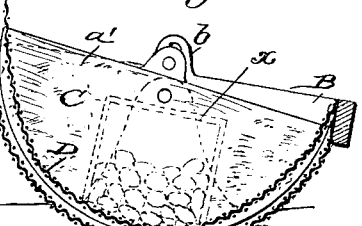
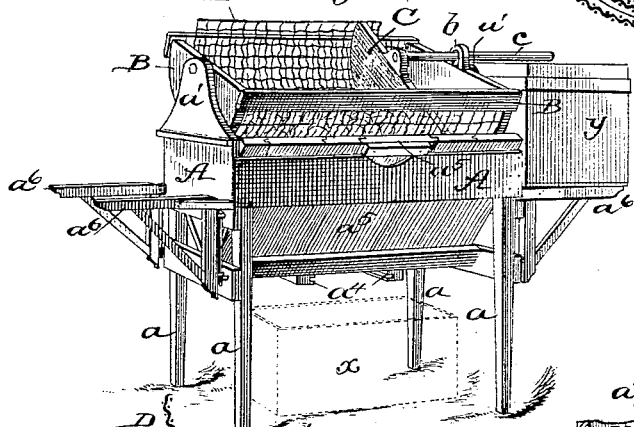
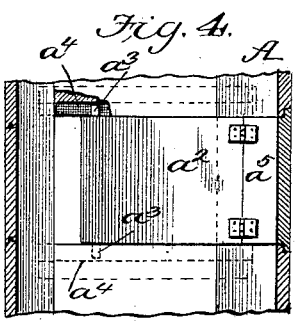
WITNESSES:
Jos. A. Ryan
Amos W. Hart
INVENTOR
John A. Burns.
BY Munn & Co.
ATTORNEYS.

UNITED STATES PATENT OFFICE.

JOHN A. BURNS, OF WOODBINE, IOWA.

EGG-SEPARATOR.

SPECIFICATION forming part of Letters Patent No. 633,423, dated September 19, 1899.

Application filed November 18, 1898. Serial No. 696,828. (No model.)

*To all whom it may concern:*

Be it known that I, JOHN A. BURNS, residing at Woodbine, in the county of Harrison and State of Iowa, have made certain new and useful Improvements in Egg-Separators, of which the following is a specification.

It is the object of my invention to provide an improved means or apparatus for separating eggs from the filling material—such as bran, oats, &c.—in which they are ordinarily packed and shipped by the farmers or other dealers to be again repacked for the market or retail trade.

The construction, arrangement, and operation of parts are as hereinafter described, reference being had to the accompanying drawings, in which—

Figure 1 is a perspective view of my improved apparatus, illustrating the manner of manipulation or use of the same. Fig. 2 is another perspective view. Fig. 3 is a vertical transverse section. Fig. 4 is a horizontal section of a portion of the hopper of the apparatus. Fig. 5 is a sectional view of the cradle, showing an egg-box inverted therein.

The hopper A has inclined sides and is supported by four legs $a$. A rocking sieve or reticulated cradle B, having a semicircular form, is pivoted at its ends in vertical ears $a'$, which form permanent and rigid attachments of the hopper A. Said cradle is formed of a wooden frame having semicircular ends and a bottom composed of woven wire. A semicircular board C is arranged at one end of the cradle B within the same and attached to a rod or bar $c$, which is adapted to slide in a slotted ear $b$, formed on the adjacent end of the cradle B. This device serves as a means for holding the eggs confined in a definite portion of the cradle B, as will be hereinafter described.

D indicates a piece or sheet of woven wire which is arranged within the cradle B and permanently attached at one side to the front edge of the latter.

When it is desired to separate eggs from bran, oats, or other material in which they are packed, the box containing them is placed in the cradle B, as shown in Fig. 1, and the free end of the aforesaid piece of woven wire D is drawn over the top of the box to cover the same and hold the eggs therein while the box is being inverted. When the inversion is complete, as shown in Fig. 5, the box proper is slowly lifted, which allows the eggs and filling material to discharge into the cradle. Previous to this operation, however, the board C is pushed by means of its rod $c$ against the end of the box for the purpose of holding the eggs in place, or, in other words, preventing them from spreading, whereby they will be likely to be broken. The filling material will pass through the woven-wire piece D and through the bottom of the cradle into the hopper A. If necessary, in order to facilitate this separation of said material from the eggs the cradle B may be gently rocked on its pivots. The box from which the eggs and filling material have been thus removed may be placed directly under the hopper A, as shown by dotted lines, Fig. 2, for the purpose of receiving the filling material when discharged from said hopper. Such discharge is provided for by means of a sliding bottom piece $a^2$, (see Figs. 3 and 4,) which has lateral pins $a^3$ that work in grooved guides $a$, and is hinged to another piece $a$, that forms a portion of the inclined side of the hopper A and is adapted to slide, so that it may be drawn upward, and thus retract and open the slide $a^2$. To facilitate such movement of the sliding piece $a^5$, it is provided with a cross-piece which serves as a handle, the same being shown in Fig. 2.

At each end of the hopper-frame are provided two hinged brackets $a^6$ for convenience of use in supporting an egg-case $y$. The brackets may be folded against the ends of the hopper when not in use.

The face of the sliding board or egg-holder C is padded, and also the opposite end of the cradle which is farthest from the same, in order to obviate any danger of breaking the eggs by sudden contact therewith.

It is to be noted that the rounded form of the bottom of the cradle prevents the eggs spreading or rolling laterally when dumped therein, while the sliding holder C prevents them spreading toward that end of the cradle, so that there is no danger of breakage. In case it is required to dump a pail or bucket filled with eggs the pail is laid on its side in the bottom of the cradle, with its open end against the padded end of cradle B. Then by drawing the pail backward and upward the eggs slide out and lie in the cradle without rolling around or being broken, as they would be likely to do if the cradle were flat-bottomed.

What I claim is—

1. In an egg-separator, the combination with the pivoted rocking cradle having a reticulated bottom, of a woven-wire piece attached to one edge of and made of less length than said cradle so that it is adapted to rest therein, the opposite side edge of said piece being free, whereby the latter is adapted to be folded over an egg-box, as shown and described for the purpose specified.

2. In an egg-separator, the combination with the egg-receptacle having a semicircular form and open at the top, of the egg-holding board arranged and fitted transversely therein and adapted to slide lengthwise of said cradle, and means for guiding and holding the board in place, substantially as shown and described.

3. In an egg-separator, the combination with the hopper and the rocking cradle having a semicircular reticulated bottom, of the slidable egg-holder having a semicircular form and fitted in said cradle, a rod attached to said holder, and a guide for said rod which is formed at the end of the cradle, as shown and described.

4. In an egg-separator, the hopper having a discharge-opening at the bottom, a sliding piece fitted to said bottom and another sliding piece fitted in the side of the hopper, such pieces being loosely connected as shown and described, whereby they are adapted to slide together and open or close said opening, as specified.

J. A. BURNS.

Witnesses:
S. B. KIBLER,
H. F. JOHNS.